Jan. 3, 1961 S. SOLOWAY 2,967,245
NEUTRON SOURCE FOR WELL LOGGING APPARATUS
Filed March 8, 1954 4 Sheets-Sheet 1

INVENTOR.
SIDNEY SOLOWAY
BY Robert Hochfield
HIS ATTORNEY

Jan. 3, 1961   S. SOLOWAY   2,967,245
NEUTRON SOURCE FOR WELL LOGGING APPARATUS
Filed March 8, 1954   4 Sheets-Sheet 2

INVENTOR:
SIDNEY SOLOWAY
BY Robert Hockfield
HIS ATTORNEY

INVENTOR.
SIDNEY SOLOWAY
BY Robert Hosefield
HIS ATTORNEY

United States Patent Office 2,967,245
Patented Jan. 3, 1961

2,967,245

NEUTRON SOURCE FOR WELL LOGGING APPARATUS

Sidney Soloway, Norwalk, Conn., assignor, by mesne assignments, to Schlumberger Well Surveying Corporation, Houston, Tex., a corporation of Texas Filed Mar. 8, 1954, Ser. No. 414,837

22 Claims. (Cl. 250—84.5)

This invention relates to well logging apparatus and, more particularly, pertains to a new and improved neutron generator especially adapted to traverse the narrow confines of a well or bore hole, although useful in a variety of other applications. Since a neutron generator embodying the present invention is ideally suited to the needs of well logging service, it will be described in that connection.

It has been proposed heretofore that a generator of high energy neutrons be employed in neutron-gamma ray or in neutron-neutron logging. As contrasted with a radium-beryllium source conventionally utilized for such logging, a neutron generator may feature a negligible amount of radiation other than the desired neutrons, a higher yield of neutrons, a controlled yield of neutrons, neutrons at higher energy than formerly possible, monoenergetic neutrons and control of the generator source to permit its deactivation prior to withdrawal from a well. The first five of these attributes are important in obtaining more informative logs, whereas the last is valuable in minimizing health hazards to operating personnel.

In general, prior neutron generators were only suited for laboratory use and were not designed to meet the severe requirements imposed on well logging equipment. Thus, presently available neutron generators are much too large to be passed through a borehole. The components are not adaptable to the source-detector spacing requirements of well logging. Moreover, these neutron generators are too critical in their operation and too fragile for logging service.

It is, therefore, a primary object of the present invention to provide an improved neutron generator which meets all requirements of logging service.

A particular object of the present invention is to provide an improved neutron generator which is small enough to permit its introduction into an inherently cylindrical borehole.

Another object of the present invention is to provide an improved neutron generator which may be reliably operated during a logging run without requiring critical and continuous operating adjustments.

An additional object of the present invention is to provide an improved neutron generator which may be reliably operated at the high ambient temperatures encountered at depth in logging operations.

Yet another object of the present invention is to provide an improved neutron generator that is rugged enough to operate efficiently and reliably although subjected to the severe physical shocks usually imposed on logging apparatus during transport to and from a well location, as well as during a logging run.

These and other objects of the present invention are obtained by providing a neutron generator comprised of an ion source, an ion accelerator and a target which preferably may be an element of the accelerator. The target includes a substance adapted to react with bombarding ions of sufficient velocity to produce neutrons.

More specifically, the generator comprises an envelope containing a gas such as deuterium. An anode and a cathode are supported within the envelope and a magnet is employed to provide a magnetic field component for effectively increasing the path of electrons traveling between the anode and cathode. Thus, a continuous ionic discharge occurs and the portion of the generator thus far described operates as a source of ions. A probe of the accelerator, which effectively reaches into the region of the ion source, removes positive ions from the source and a suitably high potential difference is impressed between the probe and the target so that these positive ions are accelerated to the required high velocity prior to striking the target. The target includes a material containing an isotope of hydrogen, for example, tritium. From the resulting deuterium-tritium reactions, neutrons are derived.

Alternatively, the target may be comprised of a metal having a lower melting temperature than its hydride. Thus, an alkali metal, such as lithium, may be combined with tritium and the resulting hydride employed as a target. In operation, after tritium is used in the deuterium-tritium reaction, the remaining lithium in each molecule melts away or evaporates at the operating temperature of the target to expose a fresh hydride surface.

The generator may also include a plurality of deflection plates supported within the envelope in a region between the ion source and the probe. By suitably energizing these deflection plates, the ion beam may be caused to traverse a desired path on the target, thereby to prevent depletion or burn out of a localized spot.

In order to maintain the neutron flux emanating from the target within prescribed limits, a detector-integrator may be employed to derive a control potential representing a characteristic of the neutron flux, such as the number of neutrons counted per unit time. This potential is employed to adjust the number of ions drawn from the ion source by the probe, thereby effecting automatic control of the neutron output since the yield is dependent upon the number of positive ions incident on the tritium target.

The apparatus may further include a control system for maintaining the ion concentration of deuterium gas in the ion source at a preselected value despite the fact that ions of the gas are continuously withdrawn. The system comprises a current-limiting, or constant current, device connected in series circuit relation with the anode and cathode of the ion source. Thus, although the pressure within the ion source may vary so as to alter the circuit impedance of the source, the voltage drop across the current-limiter varies so as to maintain the circuit current constant. Accordingly, the ion concentration within the ion source remains constant.

The control system further operates automatically in response to the ionization current to adjust the amount of gas issuing from a deuterium supply. The deuterium supply preferably may be a material containing the gas and enclosed by the anode of the ion source. Accordingly, deuterium gas may be ionized almost immediately upon emanation. In addition, the control system may respond to the ionization current in adjusting the gas-absorption rate of a gas absorber.

Because the neutron generator is a closed contiguous system, it is necessary to balance two opposing requirements. The gas pressure in the ion source must be high enough to allow sufficient ionization to be produced to give adequate ion current for its operation. However, the gas pressure must be low enough to avoid appreciable production of ionization in the accelerating gap. A stable balance may be achieved by constructing these two components so that the total electron path in the ion source is large compared to the total electron path in the accelerating gap.

As used herein, the term "mean-free-path" denotes the average distance that electrons travel in a particular gas between collisions with atoms or ions of that gas. If a sufficient number of such collisions take place, the ionization produced is cumulative, resulting in a continuous ionic discharge.

The spacing between electrodes of the accelerating gap is made small enough to minimize the path traveled by electrons in this region. In this way, ionization is inhibited despite the extremely high acceleration potential applied to the gap.

The spacing between electrodes in the ion source is made large enough to maximize the path of travel of electrons and thereby assure the occurrence of strong ionization. In addition, the auxiliary magnetic field in the ion source causes electrons to describe non-linear paths, such as spirals, in order to extend effectively the path of travel.

To assist in maintaining strong ionization in the ion source while inhibiting ionization in the accelerating gap, the generator may be provided with a conduit external of the envelope for fluidly connecting the accelerating gap region with the ion source region and associated with a pump. The pump is arranged to produce a flow of gas through the conduit in a direction from the accelerating gap toward the ion source and thereby maintains a minimum pressure in the gap at the same time maximum pressure is produced in the source. Preferably, the pump is of the type wherein the gas is ionized and flow is effected by means of a series of suitably-energized electrodes.

A strong, rugged neutron-generating device is afforded by supporting various electrodes of the device on support rods which extend longitudinally through its envelope. These rods are enclosed by sleeves of electrically insulating material and electrically insulating spacers maintain such electrodes in proper spatial relationship.

The novel features of the present invention are set forth with particularity in the appended claims. The present invention, both as to its organization and manner of operation, together with further objects and advantages thereof, may best be understood by reference to the following description taken in connection with the accompanying drawings in which:

Figure 1A:
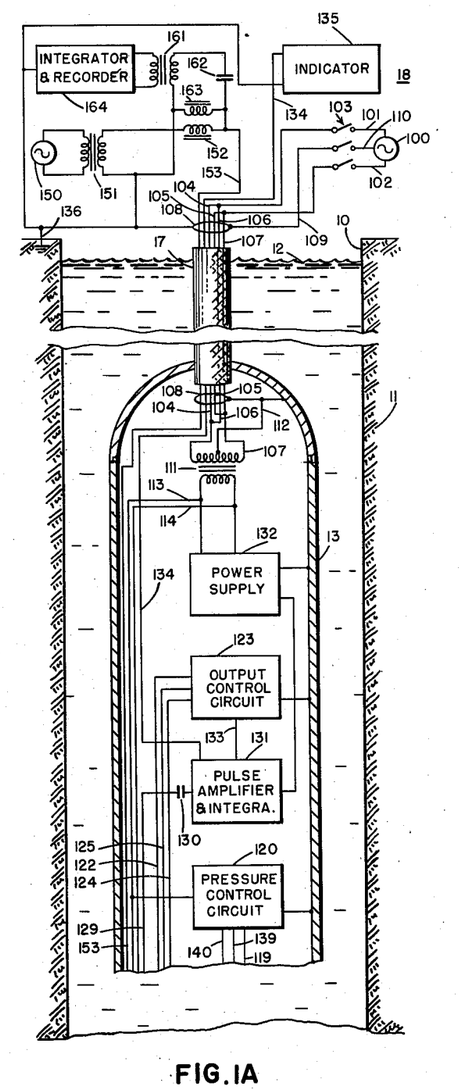
Figs. 1A, 1B and 1C illustrate schematically the upper, middle and lower portions, respectively, of neutron well logging apparatus embodying the present invention.

In Fig. 1A of the drawings, the neutron well logging apparatus embodying the present invention is shown disposed in a borehole 10 traversing a plurality of earth formations 11. Borehole 10 usually contains a hydrogenous drilling liquid 12, such as a water base or oil base mud, and it may be lined with one or more strings of metallic casing (not shown) or it may be uncased, as illustrated.

The neutron well logging apparatus may comprise a pressure-resistant housing 13 enclosing a neutron generator 14 (Fig. 1B), a radiation responsive device 15 (Fig. 1C) for detecting the phenomena to be observed, and associated electronic equipment required for proper operation of the neutron generator and the detector, as described in greater detail hereinafter.

A shield plate 16, disposed above detector 15, may be employed to shield the detector from radiation emanating from generator 14. If the apparatus is to be used for obtaining neutron-gamma ray logs, the shield may be composed of lead, and if neutron-neutron logs are desired, the shield may be constructed of a boron compound, such as boron carbide imbedded in paraffin. Of course, a composite sheet of lead and boron loaded paraffin may be utilized if suitable detectors are included for obtaining both types of logs simultaneously or successively.

Housing 13 is suspended in the borehole by means of an armored cable 17 which, in connection with a winch (not shown) located at the surface of the earth is utilized to lower and raise the apparatus in the borehole in a customary manner. As will be later described in detail, cable 17 comprises a plurality of insulated conductors that electrically connect the apparatus within housing 13 with surface equipment 18.

The neutron generator 14 (Fig. 1B) is suitably supported by a conventional shock mounting (not shown) within housing 13. The generator comprises an evacuated envelope 19, preferably constructed of out-gassed Pyrex glass, and filled with deuterium gas under a selected pressure which may be in the neighborhood of 1 to 10 microns of mercury.

Figure 2:
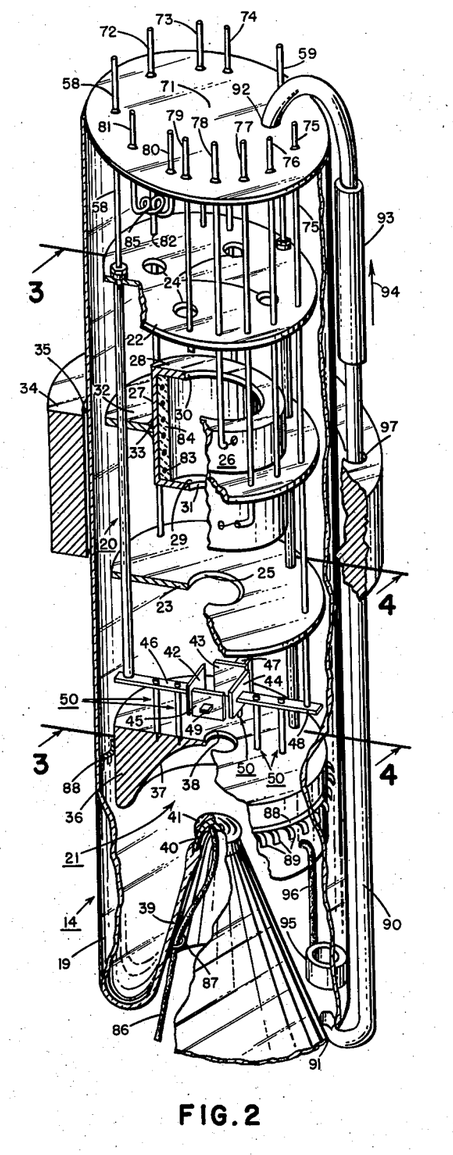
Fig. 2 is an enlarged, perspective view of the neutron generator illustrated in Fig. 1B, portions of the device being shown broken away and in section to reveal various interior details thereof.

As best seen in Fig. 2, envelope 19 encloses the elements of an ion source 20 and an accelerating gap 21. Source 20 includes upper and lower metallic cathode electrodes 22 and 23 of disc-like configuration supported in spaced, parallel relationship. Disc 22 is provided with a plurality of openings 24 distributed about an annular path and spaced radially from the center of the disc, whereas disc 23 includes a central aperture 25 positioned in coaxial alignment with envelope 19.

Ion source 20 further includes a metallic anode electrode 26 supported between cathodes 22 and 23 and comprised of a hollow, cylindrical member 27 terminated by upper and lower plates 28 and 29 provided with respective openings 30 and 31. These openings have a diameter somewhat greater than the diameter of aperture 25 and the anode 26 is positioned so that cylinder 27 and the openings 30 and 31 are in coaxial alignment with envelope 19. An annular metal plate 32 having a central opening 33 receives cylinder 27 and is mechanically and electrically connected thereto.

A cylindrical member 34 of magnetic material, such as an alloy of aluminum, nickel and cobalt, commonly referred to as alnico, has a generally cylindrical opening 35 which receives envelope 19. Its position and longitudinal length are such that it is essentially co-extensive with cylinder 27 of anode 26. Member 34 is permanently magnetized so that its upper and lower ends are of opposite magnetic polarity, thereby establishing an axial magnetic field within envelope 19. The strength of this magnetic field is preselected, in view of the spacing between anode 26 and cathodes 22, 23 to achieve a mean-free-path for electrons which move spirally due to the field, sufficient to promote strong ionization of the deuterium gas within envelope 19. For example, a strength of 500 gauss with an electrode spacing of 3 inches has been found suitable. If desired, a pellet (not shown) of radioactive material, such as radium, may be associated with ion source 20 to initiate ionization of the gas.

This general type of ion source is disclosed in the copending application of John T. Dewan, filed April 9, 1952, bearing the Serial Number 281,378 and assigned to the same assignee as the present application.

Accelerating gap 21 is comprised of a metal probe 36 of generally cylindrical configuration having a lower, hemispheric opening 37 terminating in a central aperture 38 coaxially aligned with non-conducting envelope 19. The lower portion of envelope 19 is flared inwardly to form a re-entrant, cone-like, tubular section 39 which terminates at and is sealed to a metal target 40 of hemispheric configuration and constructed of an alloy of nickel, cobalt, manganese and iron, commonly referred to as Kovar. The spacing between target 40 and the surface of opening 37 in probe 36 is smaller than the mean-free-path. Thus, ionization of deuterium gas does not occur although these electrodes are suitably energized for operation as an accelerating gap for the deuterium ions.

Target 40 preferably is plated with a layer 41 of zirconium, or other hydrogen-absorbing metal, which is hydrided in a well-known manner with tritium. For example, the zirconium layer may be alternately heated and cooled in an atmosphere of this isotope of hydrogen. Of course, deuterium may be employed for this purpose if a deuterium-deuterium reaction is desired instead of a deuterium-tritium reaction.

The neutron generator further includes a plurality of metal deflection plates 42–45 positioned between cathode plate 23 and probe 36. These deflection plates are oriented with respect to the longitudinal axis of envelope 19 so that ions traversing a path between apertures 25 and 38 may be deflected in two dimensions, thereby to control the point at which such ions impinge on target layer 41. Moreover, as will be pointed out more particularly hereinafter, these plates may be employed to control the focus of the beam of ions striking the target.

Each of deflection plates 42–45 is supported by a respective one of electrically conductive strips 46–49. Each strip extends from its deflection plate in a radial direction relative to the longitudinal axis of envelope 19 and is supported by, but insulated from, probe 36 on a pair of similar mountings 50.

Figure 3:
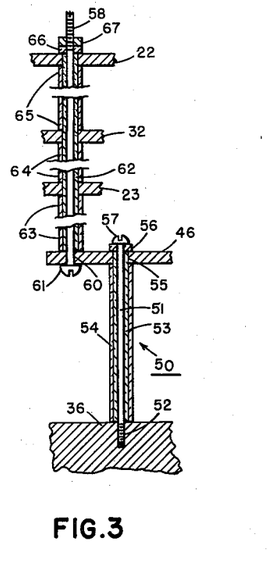
Figs. 3 and 4 are partial cross sectional views taken along lines 3—3 and 4—4, respectively, of Fig. 2 and drawn to an enlarged scale.

For example, as shown in Fig. 3, mounting 50 comprises a bolt 51 threaded into an opening 52 in the upper side of probe 36. The body of bolt 51 is received by a thin insulating tube or sleeve 53 which may be constructed of out-gassed glass and which, in turn, is received by another thin, out-gassed glass tube 54. The lower extremities of tubes 53 and 54 terminate at the upper surface of probe 36, while the upper extremity of tube 54 terminates at the under surface of strip 46. Strip 46 is provided with an opening 55 which receives tube 53, and this tube terminates at the upper surface of strip 46. A glass washer 56 is interposed between the upper surface of strip 46 and head 57 of bolt 51 so that although the bolt may be tightened to secure strip 46 with respect to probe 36, the bolt 51 is electrically insulated from the strip. Moreover, since the strip is firmly clamped between the under surface of washer 56 and the upper end of outer tube 54, a rigid mechanical connection is achieved.

To maintain the electrodes 36, 23, 32 and 22 in proper longitudinally spaced relationship, a pair of long metallic rods 58 and 59 and a suitable spacer arrangement are provided. As shown in Fig. 3, rod 58 passes through an opening 60 in support strip 46 and its head 61 mechanically and electrically contacts the under side of this strip. An inner sleeve 62 of an electrically insulating material, such as an out-gassed glass tube, extends between the upper surface of strip 46 and the upper surface of cathode plate 22, passing through aligned openings in the plates 23, 32 and 22. These openings have a diameter smaller than the outer diameter of a plurality of insulating spacers 63, 64 and 65, constructed of thin out-gassed glass tubing. Spacer 63 extends between the upper surface of strip 46 and the lower surface of disc 23, spacer 64 extends from the upper surface of disc 23 to the under side of plate 32, and spacer 65 likewise extends between plate 32 and disc 22. An insulating washer 66, which may be constructed of out-gassed glass, separates and electrically insulates a nut 67 from cathode disc 22. The nut 67 is threaded to rod 58 and may be tightened in order to bind the several elements into a rugged unitary assembly.

Figure 4:
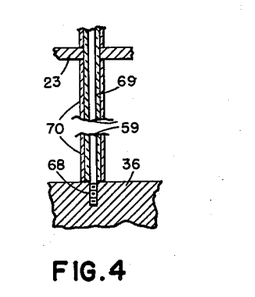

Rod 59 is arranged in a manner similar to rod 58, but as shown in Fig. 4, its lower extremity is threaded into an opening 68 in probe 36. It is received by a long, thin glass sleeve 69 which, in turn, receives a series of glass spacers like the one designated 70 extending between the upper surface of probe 36 and the lower surface of cathode plate 23. Its upper end is provided with an arrangement similar to insulating washer 66 and nut 67 by means of which several elements may be bound in place.

The upper extremities of rods 58 and 59 extend through a conventional header 71 which closes envelope 19. The usual type of pressure-tight seals are employed for these leads as well as the remaining metallic leads 72—81. Thus, connections may be introduced to the several elements within non-conducting envelope 19.

Lead 72 is connected at its lower end to cathode disc 23 and is provided with a thin sleeve of insulating material. It passes through an opening (not shown) in plate 32 and an aligned opening 82 in cathode plate 22. Similarly, leads 74, 75, 76 and 79 are electrically connected to support strip 47 for deflection plate 43, support strip 48 for deflection plate plate 44, anode plate 32, and support strip 49 for deflection plate 45, respectively. Of course, each is provided with an insulating sleeve so that no electrical connections are made at the points at which it passes through aligned openings in others of the electrodes. Lead 73 is directly connected to the uppermost cathode disc 22.

Leads 77 and 78 are enclosed by individual glass sleeves, and after passing through respective openings in cathode plate 22, are connected to the ends of a filament winding 83 which is imbedded in a cylindrical layer 84 of deuterium-emitting material coated on the inner wall of cylinder 27. Layer 84, for example, may comprise a mixture of granulated zirconium deuteride and a suitable refractory material. Thus, as the temperature of the layer increases due to energization of filament 83, the pressure of deuterium over the surface of the layer increases. Layer 84 is so loaded with deuterium that when heated by filament 83 to a temperature in the range from 200° C. to 350° C., deuterium is emitted.

Another filament 85 is supported by leads 80 and 81 in the portion of envelope 19 bounded by header 71 and cathode plate 22. This filament is composed of an absorber material such as zirconium and is arranged so that, at a temperature in the range from 350° C. to 450° C., gas is absorbed.

A lead 86 extending through re-entrant envelope section 39 is soldered or welded to target 40. It passes through a U-shaped guide 87 which is secured to one side of re-entrant section 39.

In order to maintain probe 36 in coaxial alignment with envelope 19, an annular centering member 88 is fixed to the periphery of the probe. Member 88 comprises a plurality of curved fingers 89 of a resilient material which flexibly engage the inner surface of the envelope 19. Such a non-rigid connection permits a small degree of relative movement between the probe end of the electrode assembly and the envelope.

Figure 8:
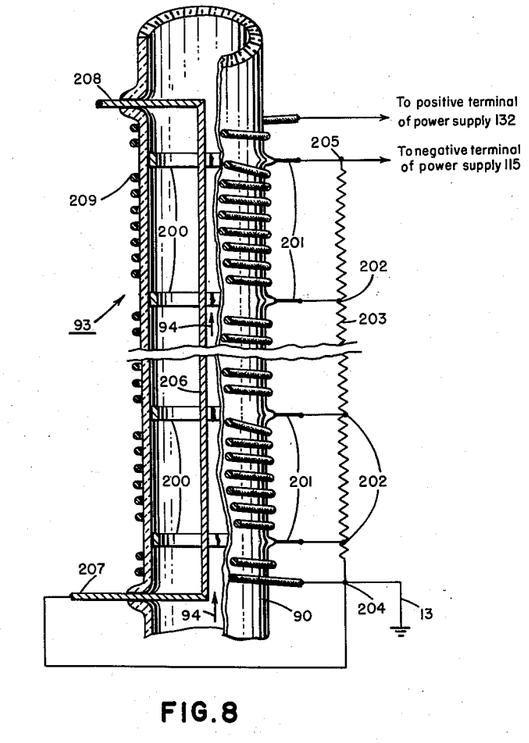
Fig. 8 is an enlarged longitudinal view, shown partly cut-away and in section, of an ion pump suitable for use in association with the neutron generator shown in Fig. 2.

If desired, neutron generator 14 may be provided with a conduit 90 connected at one of its ends to the lower extremity of envelope 19 by an annular seal 91. The other end of conduit 90 is connected to header 71 by an annular seal 92. A pump 93, such as a conventional diffusion pump, a mechanical pump, or one of the type to be later described in connection with Fig. 8, is interposed in conduit 90 and operates to move gas in the general direction of arrow 94.

An auxiliary, ring-like electrode 95 is disposed in the vicinity of junction 91. It is supported by a thin, conductive rod 96 which depends from probe 36. The spacing between auxiliary electrode 95 and target 40 is arranged to inhibit ionization which might otherwise occur due to the long path for electrons traveling from target 40 through tube 90 to cathode plate 22.

Opening 35 of magnet 34 is provided with a cut-out 97 to permit the passage of tube 90. Thus, the magnet may simply be slipped over the assembly of envelope 19 and tube 90.

In constructing generator 14, the usual precautions observed in the fabrication of discharge devices are observed. For example, metal materials for the various electrodes are selected so that there is relative freedom from gases that may be absorbed prior to, or during, the fabrication process, and which may be later expelled in operation to contaminate the generator. Moreover, with the exception of the elements of the ion source, the electrode metals may be selected on the basis of low secondary-electron-emission characteristics to minimize the possibility of breakdown. Alternatively, an easily out-gassed metal may be employed if coated with a thin layer of material of low thermal emissivity. Electrodes of the ion source may be constructed of nickel or an alloy of nickel and chromium, commonly referred to as Nichrome, or any other metal providing good secondary emission to aid ionization. The original out-gassing is accomplished by a conventional tube (not shown) which projects externally of header 71. The required amount of deuterium is introduced through the tube before it is sealed.

Referring now to Fig. 1A, in order to provide power for operating generator 14 and its associated circuitry, and yet remain within the voltage- and current-carrying capabilities of conductors in cable 17, power is supplied by a single-phase center-tapped source 100 of alternating current located at the surface of the earth in equipment 18. For example, source 100 may provide 600 volts at 400 cycles at conductors 101 and 102 which are connected via an operating switch 103 to conductors 104, 105, 106 and 107 of cable 17, arranged to provide parallel, two-wire lines. To ascertain that the voltage between any of the conductors 104–107 and a shield 108 of cable 17 does not exceed approximately 300 volts, shield 108 is connected by a conductor 109 and switch 103 to a center-tap lead 110 of source 100 which is at a point of equal potential with respect to leads 101 and 102.

Paralleled leads 104, 106 and 105, 107 are connected to the primary winding of a step-down transformer 111 mounted within housing 13. The primary winding of transformer 111 is center-tapped and is connected by a lead 112 to shield 108 and to housing 13. Under normal load conditions for the operation of neutron generator 14 and its associated circuits, the voltage applied to the surface end of cable 17 is materially reduced due to the conductor resistances before reaching the housing end of the cable. Accordingly, a voltage of approximately 300 volts is applied to the primary winding of transformer 111 and the turns ratio of this transformer is arranged so that a voltage in the neighborhood of 115 volts is available at conductors 113 and 114. Of course, the transformer may be of any well-known adjustable type so that the required voltage output may be derived.

Figure 1B:
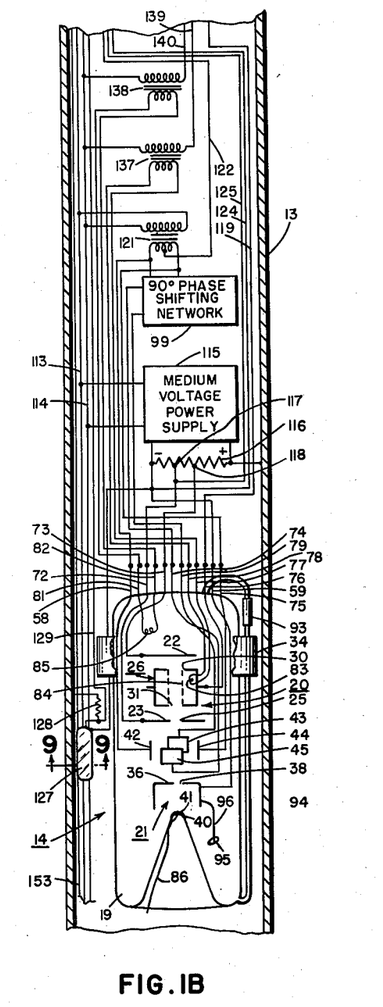
Figure 1C:
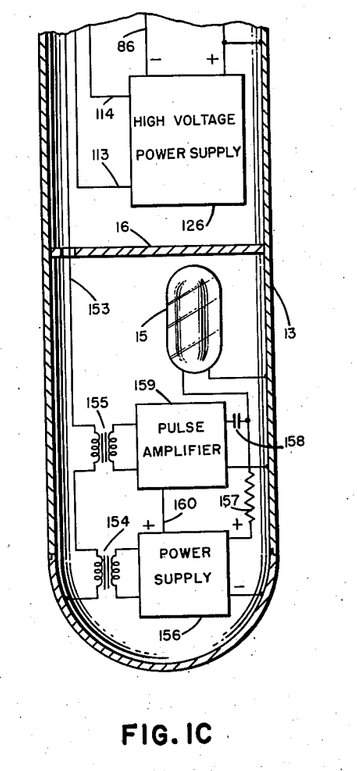

Leads 113 and 114 extend longitudinally through housing 13 and, as shown in Fig. 1B, are connected to a medium-voltage power supply 115. Supply 115 provides a unidirectional output of approximately 1500 volts and its output terminals are shunted by a voltage-dividing resistor 116. The positive terminal of the supply is grounded to housing 13 and its negative terminal is connected to lead 59 which extends to probe 36 of generator 14. A tap 117 of voltage divider 116, at approximately 100 volts from the negative terminal of supply 115, is connected to the lead 72 which extends to cathode 23 of ion source 20. Another tap 118, displaced approximately 25 volts from tap 117 in a positive direction, is connected by lead 73 to cathode 22 of the source. To complete the circuit for ion source 20, anode 26 is connected by leads 76 and 119 to a current-limiting variable impedance in a control circuit 120 (Fig. 1A) to be described in detail hereinafter. The variable impedance of circuit 120 is, in turn, connected to housing 13, thus an ionization potential in the neighborhood of 1500 volts is applied between the anode and cathode electrodes of ion source 20.

The leads 58 and 75 of deflection plates 42 and 44 are connected to the secondary winding of a step-down transformer 121 whose primary winding is connected to alternating-current supply leads 113 and 114. The leads 74 and 79, which extend to deflection plates 45 and 43, are coupled to the secondary winding of transformer 121 via a phase-shifting network 99 that imposes a phase shift of approximately 90 degrees on the applied potential which alternates at a rate of 400 cycles per second. A center tap for the secondary winding of transformer 121 is connected by a lead 122 to an electronic voltage divider (to be described in detail hereinafter) of an output control circuit 123 (Fig. 1A). Leads 124 and 125 connect the negative terminal of supply 115 and tap 117, respectively, of voltage divider 116 to the effective opposite ends of the voltage divider within circuit 123.

As shown in Fig. 1C, supply conductors 113 and 114 are connected to a high voltage power supply 126. Supply 126 may be of conventional construction or may be of the specific type disclosed in the copending application of Wayne R. Arnold, filed March 8, 1954, Serial No. 414,761, now Patent No. 2,914,677 and assigned to the same assignee as the present application. It develops a unidirectional potential in the neighborhood of 100 kilovolts applied to accelerating gap 21 by means of a connection between housing 13 and the positive terminal of the supply and a connection between the negative terminal to target lead 86.

In order to control the neutron flux produced by generator 14, a monitor detector 127 (Fig. 1B), such as an argon-filled proportional counter tube provided with a lining of hydrogenous material, is disposed in housing 13 in the general vicinity of the target electrode section of the generator. One lead of tube 127 is connected to the negative terminal of medium-voltage power supply 115 and the remaining lead is connected to housing 13 by a resistor 128. The junction of the lead from tube 127 and resistor 128 is connected by a lead 129 to a coupling condenser 130 (Fig. 1A), in turn, connected to a conventional pulse amplifier and integrator unit 131.

The usual form of power supply 132, energized from leads 113 and 114, supplies a unidirectional potential for the operation of unit 131 which, after amplifying and integrating incoming pulses, supplies an output potential representative of a characteristic of the generated neutron flux, such as counts per unit time, to the input circuit of output control circuit 123 over a lead 133.

As will be later described in connection with Fig. 5, the potential on lead 133 controls the electronic voltage divider of control circuit 123 in such a manner that the potential supplied over lead 122 to deflection plates 42—45 is negative relative to cathode 23 of ion source 20 and its absolute magnitude varies inversely with neutron flux to effect automatic output control.

The pulses supplied to unit 131 are representative of the neutron flux emanating from generator 14. After amplification in stage 131, these pulses are supplied over a conductor 134 of cable 17 to an indicator 135 of surface equipment 18. The indicator circuit is completed by a ground connection 136 which also extends to shield 108 of cable 17. Indicator 135 may, for example, comprise an integrator and a peak-reading voltmeter so that a continuous indication of the neutron flux is obtained.

To control the gas pressure within envelope 19 (Fig. 1B), filament 83, associated with hydrogen-emitting substance 84 is connected via its leads 77 and 78 to the secondary winding of a step-down transformer 137 and absorber filament 85 is connected via its leads 81 and 82 to the secondary winding of another step-down transformer 138. One terminal of the primary winding of each of transformers 137 and 138 is connected to power lead 114 and the remaining terminals of these transformers are connected via leads 139 and 140, respectively, to pressure control circuit 120 (Fig. 1A). As will be described in detail in connection with Fig. 6, pressure control circuit 120 comprises a relay device for selectively connecting either of leads 139 and 140 to power lead 113 in response to the current which flows in the anode-cathode circuit of ion source 20. That is, when this current tends to increase due to an increase in pressure in envelope 19, above a first value, transformer 138 is energized so that gas is absorbed by filament 85. Conversely, a decrease in pressure causes the de-energization of filament 85, and when the pressure goes below a second value lower than the first, the energization of transformer 137 occurs and filament 83 emits deuterium.

A similar form of gas-pressure control system is disclosed in the copending application of Sidney Soloway, filed December 21, 1953, bearing the Serial Number 399,505, now Patent No. 2,880,373, and assigned to the same assignee as the present application.

The portion of the well logging apparatus thus far described relates to the generation of neutrons for irradiating formations 11. In order to obtain a log, for example, of the resulting gamma radiation, means are provided for energizing detector 15 (Fig. 1C) and for recording a characteristic of its output. To this end, a source of alternating current 150 in surface equipment 18 is coupled to a transformer 151 having one terminal connected to grounded shield 108 and the other terminal connected via an isolating choke 152 to a conductor 153 of cable 17. Conductor 153 traverses housing 13 and it is connected to the housing via the series-connected primary windings of transformers 154 and 155. Transformer 154 is a power transformer for a conventional power supply 156 having its negative output terminal connected to housing 13. Power supply 156 develops the high voltage for operating tube 15 applied thereto over an isolating resistor 157. The remaining terminal of tube 15 is connected by a lead to housing 13. The junction of resistor 157 with the lead to tube 15 is connected by a coupling condenser 158 to the input circuit of a conventional pulse amplifier 159. The input circuit of the amplifier is completed by a suitable connection to housing 13, and a voltage of proper magnitude for operating the amplifier is derived from power supply 156 over a lead 160. Transformer 155 is a pulse transformer to which the output signal of amplifier 159 is applied.

This output signal is derived at surface equipment 18 by a pulse transformer 161. The primary winding of the transformer is connected to a filter including a series condenser 162 and shunt choke 163 for attenuating voltages at the frequency of source 150. The transformer's secondary winding is connected to a conventional integrator and recording unit 164. Unit 164, for example, may comprise a capacitor for deriving a potential representing the number of pulses applied per unit time and a recording voltmeter to which this potential is applied. The recording medium of the voltmeter is displaced in a customary manner in synchronism with movement of housing 13 through borehole 10 so that a continuous log may be obtained.

In operation, housing 13 is lowered into borehole 10 prior to closing switch 103. Thus, operating personnel are shielded from any dangerous radiation emanating from neutron generator 14 by the earth formations 11 and drilling fluid 12.

With switch 103 closed, power supply 115 energizes ion source 20 (Fig. 1B) and electrons spiral, due to the influence of magnet 34, from cathodes 22 and 23 toward anode 26. Strong ionization of the gas within anode 26 thus occurs and, in the ensuing continuous ionic discharge, great numbers of positive ions of deuterium are produced.

By reason of the manner in which cathodes 22 and 23 are connected to voltage divider 116, cathode 23 is at a negative potential with respect to cathode 22 and an ionic drift occurs through ion source 20 in the general direction of cathode 23. Some of these positive ions pass through opening 25 in cathode 23 and, assuming that deflection plates 42-45 are impressed with an average potential that is negative with respect to cathode 23, ions are drawn by these plates in the direction of probe 36. This flow of ions is assisted by the negative potential of probe 36 relative to deflection plates 42-45 and some ions pass through opening 38 in the probe. Since power supply 126 impresses a high potential between the probe and target 40, positive ions are accelerated to very high velocities prior to striking target material 41. The highly accelerated positive deuterium ions thus react with the tritium in the target material and neutrons of energies in the neighborhood of 14 million electron volts are generated.

Since ions, prior to acceleration, are under the influence of the electrostatic field produced by deflection plates 42-45, the ion beam does not impinge on target material 41 at a single point. Instead, the applied voltages, which are displaced in phase by 90°, cause the beam to traverse a circular path on the target material. By thus distributing the ion beam over a larger area of the target, localized heating and burn-out of the target material is prevented. Of course, if desired, a suitable frequency multiplier may be substituted for phase shifter 99 so that patterns having a configuration other than a circle may be described on target material 41 in a known manner.

Positive ions upon striking target material 41 produce secondary electrons which are accelerated across gap 21 in the direction opposite to ion travel. Most of these electrons pass through openings 38, 25, 31 and 30, traversing ion source 20 without collision, and strike cathode 22. If desired, a plate (not shown) constructed of a refractory material of low atomic number, such as quartz or beryllium oxide may be positioned in the path of such electrons at plate 22, as suggested in the aforementioned copending application of Wayne R. Arnold. The electrons thus may be prevented from striking cathode 22 where they might undesirably cause localized heating and the emanation of absorbed gases. In addition, such a plate may serve to prevent possible recombinations of electrons and ions at the surface of the cathode.

High energy neutrons emanating from target material 41 irradiate formations 11 as well as detector 127. A small fraction of the incident neutrons produce recoil protons in the hydrogenous lining of the detector. Some of these protons cause ionization in the gas of the detector and the resulting pulses are amplified and integrated in stage 131. Thus, a control potential is developed and applied to output control circuit 123 which controls the relative average potential between cathode 23 and deflection plates 42-45. If the neutron flux increases, the number of counts per second increases and output control circuit 123 reduces the potential between cathode 23 and deflection plates 42-45 so that fewer ions are drawn from source 20 toward accelerating gap 21, thereby decreasing the neutron flux. Conversely, a decrease in the neutron flux causes an increase in the negative voltage applied between cathode 23 and deflection plates 42-45. In this way, the neutron flux remains substantially constant over a wide variety of operating conditions.

Control system 120 serves two important functions. In the first place, it maintains the ion concentration within the plasma of the continuous ionic discharge in ion source 20 essentially constant. This is accomplished by the current-limiting impedance (not shown) that is in series with the anode and cathode of the source. Thus, if the anode-cathode current tends to increase, the current-limiter effectively reduces the potential across the ion source. This reduces the ionization current and the ion concentration is not permitted to rise. Conversely, an increase in the potential across the ion source 20 accompanies a tendency toward decreasing current.

In the second place, if the gas pressure within envelope 19 decreases below a prescribed limit and the ion source current does decrease, a relay (not shown) of circuit 120 completes an energization circuit for transformer 137, thereby heating filament 83. This filament heats material 84 to its deuterium-emitting temperature. Above this limit, filament 83 is de-energized, and if the gas pressure increases beyond a selected, higher value, the relay mechanism of circuit 120 energizes transformer 138. Thus, absorber filament 85 is heated to its operating temperature. It is evident that the pressure within envelope 19 may be maintained constant at a desired value.

Pump 93 operates continuously so that gas is drawn through tube 90 in direction 94 from accelerating gap 21 toward ion source 20. Accordingly, the pressure in the ion source is maintained slightly higher than in the accelerating gap. This permits a greater efficiency in the formation of ions in the ion source, while reducing the possibility of breakdown in the accelerating gap.

Irradiation of the formations 11 by the neutrons produced in generator 14 results in nuclear radiation that is incident on detector tube 15. The detector responds to gamma rays and its output is in the form of pulses which are amplified in stage 159 before being fed to the integrator and recorder of unit 164 of surface equipment 18. It is, therefore, apparent that a neutron-gamma ray log is obtained, providing information regarding the earth formations traversed by the borehole such as enumerated in detail in the copending application of Clark Goodman, filed March 11, 1952, bearing the Serial Number 275,932 and assigned to the same assignee as the present application.

Of course, other types of logs may be derived. For example, tube 15 may be a proportional counter lined with a hydrogenous material or a boron compound. In that way, a neutron-neutron log may be obtained. Moreover, with suitable provisions, a combination neutron-gamma ray and neutron-neutron log is possible. Alternatively, by pulsing generator 14, for example, through the medium of the application of control pulses of positive polarity at lead 122 and gating detector 15, an activation log may be obtained.

Since automatic controls are provided for gas pressure and neutron flux, the neutron generator embodying the present invention may be reliably operated during an entire logging run. The operator need not be concerned with any critical and continuous adjustments to the equipment.

In general, by reason of the particular and unique construction of the generator 14, as evident in Fig. 2, a relatively rugged device is possible. Moreover, generator 14 has a configuration small enough so that it is adapted to the elongated, small-diameter, cylindrical housings suitable to be passed through conventional oil-filled boreholes. The remainder of the borehole apparatus may be readily accommodated to the size and ruggedness requirements of equipment adapted to be passed through a borehole.

Therefore, the well logging apparatus embodying the present invention meets all requirements of logging service.

It will be observed that since the ion beam traverses an opening defined by deflection plates 42–45 and opening 38 of probe 36, these electrodes may be operated as an electrostatic lens. Thus, by adjusting the potential impressed between probe 36 and deflection plates 42–45, the area of the ion beam at target layer 41 may be controlled to achieve a desired focus. For example, the beam may be spread so that a relatively large target area is bombarded with deuterium ions. In this way, the rate at which the target is depleted of tritium may be reduced as compared with a narrow beam impinging on a small area of the target.

Figure 5:
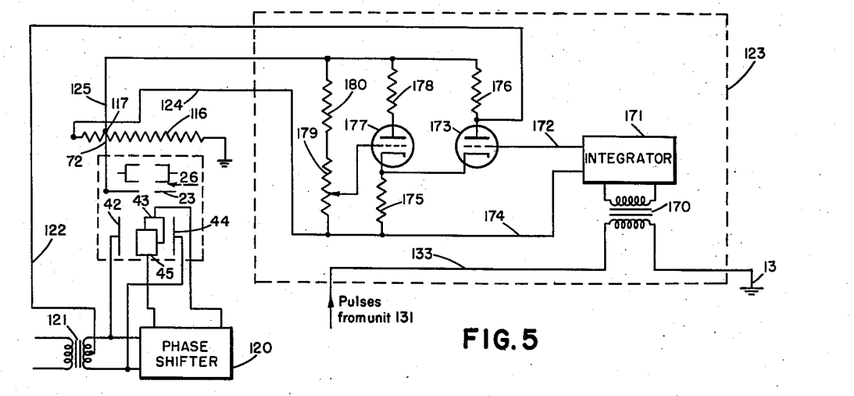
Figs. 5 and 6 are electrical circuit diagrams illustrating the details of certain of the elements shown in Fig. 1A.

In Fig. 5 of the drawing, there is illustrated one form of circuit which may be employed for output control circuit 123 of Fig. 1A. Pulses from unit 131 are applied over lead 133 to a pulse transformer 170, the secondary winding of which is connected to an integrator 171 which develops a negative potential at an output lead 172 that is connected to the control grid of a triode-type electron discharge device 173. The remaining output lead 174 of integrator 171 is connected by a cathode resistor 175 to the cathode of device 173. Lead 174 is also connected to lead 124 and thus extends to the negative terminal of medium-voltage power supply 115 (Fig. 1B). An anode load resistor 176 connects the anode of device 173 to tap 117 of voltage divider 116, thereby providing a source of anode-cathode current for device 173. Lead 122, which extends to the tap of transformer 121, is connected to the junction of anode load 176 and the anode lead of device 173.

Circuit 123 further includes another electron discharge device 177 of the triode-type having its cathode tied to the cathode of device 173 and its anode connected by an anode load resistor 178 to lead 125. Its control grid is connected to the movable tap of a potentiometer 179. One terminal of the resistance element of potentiometer 179 is connected to lead 124 and the other terminal is connected by a dropping resistor 180 to lead 125.

To condition the circuit for operation, the positive grid bias on triode 177 is adjusted by means of potentiometer 179 to achieve an anode-cathode current resulting in a desired voltage drop across cathode resistor 175. Since resistor 175 is common to the cathode circuits of triodes 173 and 177, this voltage provides a negative grid bias for triode 173. Preferably, triode 173 is biased for essentially linear operation over its grid voltage versus anode current characteristic throughout an expected range of applied grid voltages.

In response to the pulses applied over transformer 170, integrator 171 develops a negative voltage having an amplitude proportional to the pulse rate. Accordingly, if the pulse rate increases, the absolute value of the negative voltage applied over leads 172 and 174 to the grid circuit of electron tube 173 increases. As a result, the anode current of tube 173 flowing through anode resistor 176 decreases and the voltage drop across this resistor decreases, thereby reducing the potential between leads 122 and 125. Conversely, a decrease in pulse rate results in a decrease in the negative voltage applied to the grid circuit of device 173. This causes the voltage drop across anode load resistor 176 to increase and the voltage between leads 122 and 125 increases.

Since the voltage between leads 122 and 125 determines the average value of the voltage between deflection plates 42–45 and cathode plate 23, it is evident that the average voltage at the deflection plates varies indirectly with the intensity of the generated neutron flux to achieve automatic output control as described hereinbefore. Obviously, the quiescent or stable operating flux may be adjusted by means of potentiometer 179.

If desired, a third filament (not shown) composed of zirconium may be mounted within envelope 19 (Fig. 1B and Fig. 2). Such a filament may be arranged to operate at a temperature in the neighborhood of 1200° C. and serve as a getter, chemically reacting with gases. The output control circuit just described may be suitably modified so that when the neutron flux output of generator 14 drops below a prescribed limit, the getter filament is energized.

Figure 6:
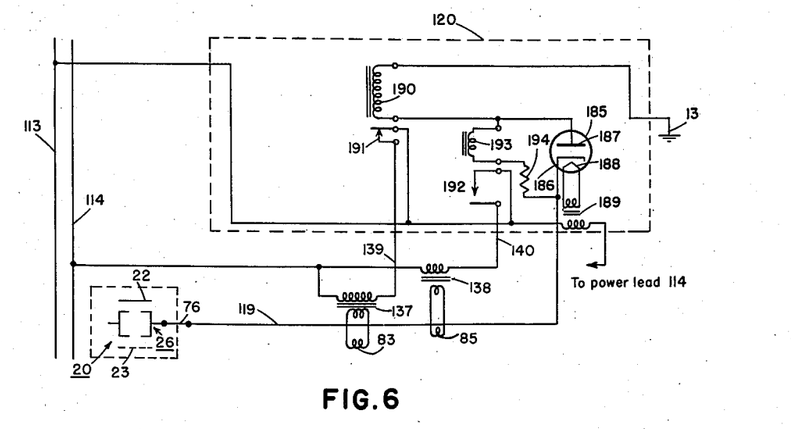

A circuit suitable for use as pressure-control circuit 120 (Fig. 1A) is illustrated in Fig. 6. This circuit comprises a diode rectifier 185 having its cathode 186 connected to the lead 119 which extends to anode 26 of ion source 20. Its anode 187 is connected to housing 13 and its filament 188 is energized from power leads 113 and 114 via a step-down transformer 189. The turns ratio of step-down transformer 189 is arranged so that the filament voltage for diode 185 is below the normal rated value. Inasmuch as diode emission is thus limited, the maximum current which may be drawn in the anode-cathode circuit for ion source 20 and diode 185 is fixed.

A relay coil 190 is interposed in the circuit between the anode 187 of diode 185 and housing 13. This relay coil is associated with a pair of normally-closed contacts 191 connected to power lead 113 and to the lead 139 which extends to transformer 137.

A pair of normally-open contacts 192 are connected to power lead 113 and to lead 140 which extends to transformer 138. Contacts 192 are associated with a relay coil 193 that is shunted across diode 185. A current-limiting resistor 194 is interposed in series relation with coil 193.

Figure 7:
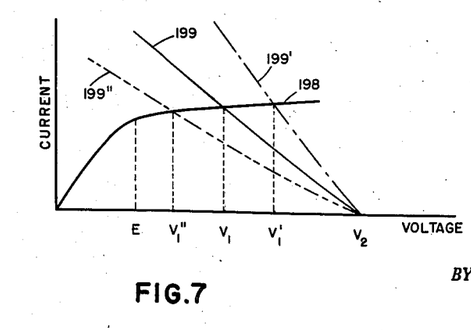
Fig. 7 features a series of curves representing certain operating characteristics of the circuit shown in Fig. 6 and which are useful in explaining its operation.

The operation of circuit 120 may best be understood by reference to Fig. 7 in which a curve 198 represents the current versus voltage characteristic for diode 185 and the curve 199 represents the voltage-current characteristic for ion source 20. It is evident that although the voltage across diode 185 may increase beyond the voltage designated E, the current flowing through the diode remains substantially constant. This characteristic is useful in maintaining the ion concentration within ion source 20 fixed despite pressure variations which might occur within envelope 19, as will be apparent from the following discussion.

As seen in Fig. 7, diode characteristic curve 198 intercepts load line 199 for source 20 at a voltage designated $V_1$. Accordingly, the voltage drop across diode 185 is $V_1$ volts and the voltage across ion source 20 may be defined as the voltage $V_2$ (at which load line 199 intercepts the voltage axis) minus $V_1$. If the pressure within envelope 19 increases, the ion source load line shifts to the position designated 199'. Due to the constant-current feature of diode 185, the intercept of load line 199' and curve 198 occurs at voltage $V_1'$, that is greater in magnitude than voltage $V_1$. In other words, the voltage drop across diode 185 increases and the voltage drop across ion source 20 decreases to the value $V_2-V_1'$. Since an increase in pressure is accompanied by a decrease in the applied voltage to ion source 20, the ion concentration remains essentially unchanged.

On the other hand, a decrease in gas pressure shifts the iron source load line to the position 199'' which intercepts curve 198 at voltage $V_1''$, smaller than $V_1$. Since the voltage across ion source 20 thereby increases to the value $V_2-V_1''$, such a decrease in pressure does not materially reduce the ion concentration in the ion source.

As long as the current flowing in the anode-cathode circuit of diode 185 produces a voltage above voltage E, the current through coil 190 is sufficient to produce a magnetic field which maintains normally-closed contacts 191 open. Accordingly, no current is supplied to filament 83. At the same time, the voltage across diode 185 may be too low to cause coil 193 to affect normally-open contacts 192 which thus remain open and no current is supplied to absorber filament 185.

If, for any reason, the current in the diode circuit drops below the value at which voltage E occurs, coil 190 is effectively de-energized, thereby closing contacts 191 and current is supplied to filament 83, which, as pointed out hereinbefore, is associated with deuterium emitting material 84. Hence, gas is emitted and gradually the pressure in envelope 19 rises. The current flowing through ion source 20 and diode 185 thus increases until the current at which voltage E occurs is obtained. At this point relay coil 190 is again energized. If pressure in envelope 19 increases to a preselected value above that at which voltage E occurs, say to the value at which voltage $V_1'$ is obtained, the voltage across diode 185 is sufficient for the field of coil 193 to close contacts 192 and filament 85 is energized. It absorbs gas and when the pressure drops, coil 193 is effectively de-energized. Therefore, automatic pressure control is provided by circuit 120.

Of course, if desired, a third filament (not shown) designed to react chemically with gases may be paralleled with filament 85 for getter operation.

In Fig. 8, the details of ion pump 93 are illustrated. It comprises a plurality of annular or ring-like electrodes 200 supported in longitudinally spaced relation within conduit 90 by respective ones of a plurality of leads 201 which pass through and are fused or sealed to the wall of conduit 90. Thus, an electrical connection may be made between each of the rings 200 and a respective one of a plurality of successive taps 202 of a voltage divider 203, having one terminal 204 connected to housing 13 and its remaining terminal 205 connected to the negative terminal of medium-voltage power supply 115. Of course, any desired number of rings 200 may be employed together with a corresponding number of taps 202 on divider 203.

A rod-like, axially extending electrode 206 is supported within conduit 90 by end connections 207 and 208, one of which, 207, is connected to terminal 204 so that electrode 206 is at a positive potential with respect to all of the ring electrodes 200.

A solenoid 209 is wound on the exterior wall of conduit 90 and is arranged so that it is spaced from and electrically insulated from each of leads 201. Solenoid 209 may comprise any desired number of layers, although only one layer is illustrated for the sake of simplicity of representation. One of its end leads is connected to ground at terminal 204 and the opposite end lead is connected to the positive terminal of power supply 132. Thereby, the solenoid may be energized and produces an axial magnetic field within conduit 90.

Electrons emitted by rings 200 are accelerated toward rod electrode 206 due to the positive potential impressed thereon. As a result of the influence of the magnetic field produced by solenoid 209, these electrons travel in spiral paths and ionizing collisions with gas molecules occur. The electrode spacings and voltages are selected to promote strong ionization, and since the ring electrodes 200 are at successively higher negative potentials relative to a direction line from the lower end to the upper end of pump 93, positive ions are urged in the direction of arrow 94. Accordingly, a net transfer of gas, as positive ions, occurs in addition to the flow of neutral molecules that takes place simply due to the flow of positive ions.

In many instances, there may be a sufficient flow of ions out of the upper end of tube 90 into envelope 19 so that ion source 20 is not needed. Consequently, pump 93 serves both as a pump as well as an ion source, thereby improving efficiency of ion production. Obviously, the elimination of ion source 20 greatly simplifies the overall construction of neutron generator 14.

Figure 9:
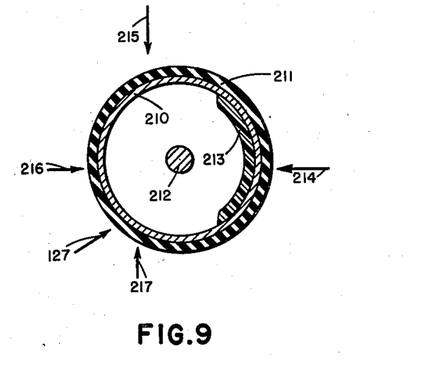
Fig. 9 is a cross sectional view taken along lines 9—9 of Fig. 1B and drawn to an enlarged scale.

The cross sectional view of Fig. 9 illustrates the interior details of monitor or detector tube 127. The tube comprises an outer electrode-envelope 210 constructed of a cylinder of electrically conductive material such as thin steel which is permeable to neutrons. Envelope 210 is surrounded by an insulating sleeve 211 which also is permeable to neutrons. For example, a fluoro-carbon, commonly referred to as Teflon, may be employed for this purpose.

An electrode 212 of rod-like configuration is supported coaxially within envelope 210 and the envelope is sealed and filled with argon or a suitable combination of argon and methane gases.

In order that detector 127 have directional properties, a layer of hydrogenous material 213, such as polyethylene, is disposed on the interior surface of envelope 210. This layer extends for less than one half the circumference of the envelope on a side thereof in the general vicinity of neutron generator 14. To improve the temperature characteristics of the polyethylene lining, it may be exposed to intense radiation prior to the incorporation of detector 127 within housing 13.

In operation, some of the fast neutrons emanating from generator 14 travel in the general direction designated 214, and enter hydrogenous material 213. Some of these react with the hydrogenous material to produce recoil protons which cause ionization of the gas within envelope 210. Thus, pulses representing the generated neutron flux are produced by detector 127.

On the other hand, high energy neutrons traveling from formations 11 or from fluid 12 of borehole 10 penetrate the detector in any of the general directions 215, 216, or 217, other than direction 214. Since the portion of the detector on which such neutrons are incident is not provided with hydrogenous material, no recoil protons are produced. Moreover, after traversing the interior of the detector and striking hydrogenous layer 213, any resulting protons have maximum energies directed away from the gas within envelope 210 and do not trigger the detector. It is, therefore, evident that detector 127 is directional and output control circuit 123 is responsive only to the neutrons emanating from neutron generator 14.

If desired, a layer of hydrogenous material may be supported within housing 13 at the opposite side of generator 14, with respect to detector 127, so that high energy neutrons returning from formations on the opposite side of the borehole may be absorbed to prevent them from being counted.

In order to achieve symmetrical bombardment of the formations by the neutrons emanating from target 40 of generator 14, monitor 127 may be mounted above or below the generator. Of course, for such an arrangement, suitable shields of hydrogenous material may be provided for the detector.

As an alternative to the use of polyethylene in the layer 213, zirconium in which hydrogen is absorbed may be employed. This is possible since the bonding of hydrogen with the zirconium is stable at high temperatures.

To obtain a different type of log, monitor 127 may be modified and mounted within a shoe that is biased relative to housing 13 so as to be maintained against the sidewall of the borehole. The modified monitor is arranged in a well-known manner to be only responsive to thermal neutrons arriving at the sidewall from the formations. Since the generated flux of high energy neutrons is under the control of the monitor, the flux of thermal neutrons at the sidewall of the borehole is maintained at a desired constant value. Accordingly, the effects of the drilling fluid and diameter variations of the borehole are minimized in the log obtained by means of detector 15.

If desired, another directional counter like unit 127 may be substituted for detector 15 to count high-energy neutrons returning from the formations independently of neutrons from generator 14. In this way, a log of fast neutrons may be obtained.

An alternative target construction makes use of a Kovar base, but instead of zirconium hydride, a layer of metal hydride having a melting temperature higher than the metal itself is utilized. For example, lithium that is hydrided with tritium may be employed, such as by evaporating lithium in a vacuum on the base metal and then introducing tritium while gently heating the lithium. This hydride has a higher melting temperature than the normal operating temperature of the target. However, when hydrogen (tritium) is removed from the target as a result of reactions with bombarding deuterons to produce neutrons, lithium remains. The vapor pressure of the remaining lithium at the usual target temperature and envelope pressure is such that it evaporates from the target, thereby exposing a fresh hydride surface. The amount of evaporated metal is extremely small, compared with the weight of the target. Hence, its collection on the inner wall of the glass envelope and on the outer surfaces of metal components does not undesirably affect the operation of the neutron generator.

It is, therefore, evident that during the operation of the neutron generator, fresh hydride is continuously exposed as tritium is consumed and high operating efficiency is maintained for extended periods of time.

Although lithium has been proposed for the alternative target construction, other metals having the desired properties may be utilized. For example, other alkali metals, such as sodium, potassium, rubidium and cesium, have melting temperatures lower than their hydrides and thus may be suitable.

If desired, an auxiliary electrode may be associated with the target 40, 41 and impressed with a potential of negative polarity relative to the target, such as may be obtained by means of a bias resistor in circuit with the target. This electrode thus operates to suppress secondary electrons at the target and, in the embodiment of the invention including lithium in the target, serves as a sink for lithium that is freed after deuterium-tritium reactions.

Moreover, target cooling may be achieved by introducing a tube (not shown) into conical section 86 of the envelope to a point adjacent cap 40. Thus, a coolant, such as compressed air, may be applied via the tube to cap 40 and the coolant then may pass between the outer surface of the tube and section 86 on its way to a suitable heat-transfer device (not shown).

Obviously, additional information from equipment within housing 13 may be supplied to indicators at the surface of the earth by conventional multiplexing techniques without requiring the use of more conductors in cable 17. For example, a detector of slow neutrons may be provided so that simultaneous neutron-gamma and neutron-neutron logs may be obtained. Also, a suitable voltmeter may be provided for monitoring the output voltage of power supply 126. Specifically, time-sharing may be utilized for multiplexing or a "phantom" circuit may be set up between cable conductors 134 and 153 and ground. Alternatively, a balanced "phantom" arrangement may be provided by using conductors 134 and 153 and conductors 104, 106 and 105, 107.

While a particular embodiment of the present invention has been shown and described, it is apparent that changes and modifications may be made without departing from this invention in its broader aspects, and, therefore, the aim in the appended claims is to cover all such changes and modifications as fall within the true spirit and scope of this invention.

I claim:

1. A neutron generating system comprising: a sealed envelope containing an ionizable gas; a target positioned within said envelope and adapted to react with ions of said gas to produce neutrons; an electrode system supported within said envelope and including first electrode means for deriving ions of said gas and second electrode means for accelerating such derived ions in a beam toward said target to a velocity sufficient to effect neutron-producing reaction; deflection electrodes supported within said envelope between said first electrode means and said second electrode means and positioned relative to said beam so as to control the position at which said beam intercepts said target; and means for applying a control potential between said deflection electrodes and one of said first electrode means and said second electrode means to adjust a characteristic of said beam in a preselected manner.

2. A neutron generating system comprising: a sealed envelope containing an ionizable gas; a target positioned within said envelope and adapted to react with ions of said gas to produce neutrons; an electrode system supported within said envelope and including first electrode means for deriving ions of said gas and second electrode means for accelerating such derived ions in a beam toward said target to a velocity sufficient to effect neutron-producing reactions; deflection electrodes supported within said envelope between said first electrode means and said second electrode means and positioned relative to said beam so as to control the position at which said beam intercepts said target; and means for applying a control potential between said deflection electrodes and said first electrode means to adjust the ion density of said beam in a preselected manner.

3. A neutron generating system comprising: a sealed envelope containing an ionizable gas; a target positioned within said envelope and adapted to react with ions of said gas to produce neutrons; an electrode system supported within said envelope and including first electrode means for deriving ions of said gas and second electrode means for accelerating such derived ions in a beam toward said target to a velocity sufficient to effect neutron-producing reactions; deflection electrodes supported within said envelope between said first electrode means and said second electrode means and positioned relative to said beam so as to control the position at which said beam intercepts said target; and means for applying a control potential between said deflection electrodes and said second electrode means to adjust the cross sectional area of said beam in the vicinity of said target in a preselected manner.

4. A neutron generating system comprising: a sealed envelope containing an ionizable gas; a target positioned within said envelope and adapted to react with ions of said gas to produce neutrons; an electrode system supported within said envelope and including first electrode means for deriving ions of said gas and second electrode means for accelerating such derived ions in a beam toward said target to a velocity sufficient to effect neutron-producing reactions; deflection electrodes supported within said envelope between said first electrode means and said second electrode means and positioned relative to said beam so as to control the position at which said beam intercepts said target; means for deriving a control potential having a magnitude responsive to the neutron flux generater at said target; and means for applying said control potential between said deflection electrodes and one of said first electrode means and said second elertrode means to adjust a characteristic of said beam so as to regulate said neutron flux in a preselected manner.

5. A neutron generating system comprising: a sealed envelope containing an ionizable gas; a target positioned within said envelope and adapted to react with ions of said gas to produce neutrons; an electrode system supported within said envelope and including first electrode means for deriving ions of said gas and second electrode means for accelerating such derived ions in a beam toward said target to a velocity sufficient to effect neutron-producing reactions; deflection electrodes supported within said envelope between said first electrode means and said second electrode means and positioned relative to said beam so as to control the position at which said beam intercepts said target; means for deriving a control potential having a magnitude responsive to the neutron flux generated at said target; and means for applying said control potential between said deflection electrodes and said first electrode means to adjust the ion density of said beam so as to maintain said neutron flux constant at a desired value in a preselected manner.

6. A neutron generating system comprising: a sealed envelope containing an ionizable gas; a target positioned within said envelope and adapted to react with ions of said gas to produce neutrons; a pair of electrodes supported within said envelope; means for applying an electric potential to said pair of electrodes to effect an ion-producing ionic discharge; a constant current device connected in series circuit relation with said pair of electrodes; and means for accelerating ions of said gas derived in said ionic discharge toward said target to a velocity sufficient to effect neutron-producing reactions.

7. A neutron generating system comprising: a sealed envelope containing an ionizable gas; a target positioned within said envelope and adapted to react with ions of said gas to produce neutrons; a pair of electrodes supported within said envelope; means for applying an electric potential to said pair of electrodes to effect an ion-producing ionic discharge; an impedance connected in series circuit relation with said pair of electrodes and having an impedance of a value variable directly with the potential applied to said impedance for effectively limiting current flow between said pair of electrodes; and means fo accelerating ions of said gas derived in said ionic discharge toward said target to a velocity sufficient to effect neutron-producing reactions.

8. A neutron generating system comprising: a sealed envelope containing an ionizable gas; a target positioned within said envelope and adapted to react with ions of said gas to produce neutrons; an ion source including an anode and a cathode supported within said envelope; an emission-limited e.ectron discharge device including an anode and a cathode; a source of unidirectional potential; means for connecting said ion source, said electron discharge device and said source of potential in a series circuit providing anode-cathode current flow in each of said ion source and said electron discharge device for effecting an ion-producing ionic discharge in said ion source, current flow in said series circuit being effectively limited by said electron discharge device; and means for accelerating ions of said gas derived in said ionic discharge toward said target to a velocity sufficient to effect neutron-producing reactions.

9. A neutron generating system comprising: a sealed envelope containing an ionizable gas; a controllable source of said gas communicating with said envelope; a target positioned within said envelope and adapted to react with ions of said gas to produce neutrons; a pair of electrodes supported within said envelope; means for applying an electric potential to said pair of electrodes to effect an ion-producing ionic discharge; an impedance connected in series circuit relation with said pair of electrodes and having an impedance of a value variable directly with the potential applied to said impedance; means associated with said source of said gas and electrically coupled to said impedance for controlling the issuance of gas from said source in response to the potential at said impedance; and means for accelerating ions of said gas derived in said ionic discharge toward said target to a velocity sufficient to effect neutron-producing reactions.

10. A neutron generating system comprising: a sealed envelope containing an ionizable gas; a controllable source of said gas communicating with said envelope; a controllable sink for said gas communicating with said envelope; a target positioned within said envelope and adapted to react with ions of said gas to produce neutrons; a pair of electrodes supported within said envelope; means for applying an electric potential to said pair of electrodes to effect an ion-producing ionic discharge; an impedance connected in series circuit relation with said pair of electrodes and having an impedance of a value variable directly with the potential applied to said impedance; means associated with said source and with said sink and electrically coupled to said impedance for controlling the issuance of gas from said source and for controlling the absorption of gas by said sink in response to selected electrical conditions at said impedance; and means for accelerating ions of said gas derived in said ionic discharge toward said target to a velocity sufficient to effect neutron-producing reactions.

11. A neutron generating system comprising: a sealed envelope containing an ionizable gas; a controllable source of said gas communicating with said envelope; a controllable sink for said gas communicating with said envelope; a target positioned within said envelope and adapted to react with ions of said gas to produce neutrons; a pair of electrodes supported within said envelope; means for applying an electric potential to said pair of electrodes to effect an ion-producing ionic discharge; an impedance connected in series circuit relation with said pair of electrodes and having an impedance of a value variable directly with the potential applied to said impedance; means associated with said source and with said sink and electrically coupled to said impedance for controlling the issuance of gas from said source in response to the potential at said impedance and for controlling the absorption of gas by said sink in response to the current flowing through said impedance; and means for accelerating ions of said gas derived in said ionic discharge toward said target to a velocity sufficient to effect neutron-producing reactions.

12. A neutron generating system comprising: a sealed envelope containing an ionizable gas; a source of said gas disposed within said envelope and including a first filament for producing a selected gas-emitting temperature in said source; a sink for said gas disposed within said envelope and including a second filament for producing a given gas-absorbing temperature in said sink; a target positioned within said envelope and adapted to react with ions of said gas to produce neutrons; a pair of electrodes supported within said envelope; means for applying an electric potential to said pair of electrodes to effect an ion-producing ionic discharge; an impedance connected in series circuit relation with said pair of electrodes and having an impedance of an essentially fixed value over one range of applied potentials and of a value variable directly with the applied potential over another range of applied potentials; a control circuit for selectively coupling said filaments to a source of energizing potential including a first relay responsive to a predetermined potential at said impedance within said other range for energizing said first filament to produce said selected gas-emitting temperature and including a second relay responsive to a predetermined current flowing through said impedance corresponding to a predetermined potential within said one range for energizing said second filament to produce said given gas-absorbing temperature; and means for accelerating ions of said gas derived in said ionic discharge toward said target to a velocity sufficient to effect neutron-producing reactions.

13. A neutron generating system comprising: a sealed envelope containing an ionizable gas; a material adapted to emit said gas at a selected temperature; a target positioned within said envelope and adapted to react with ions of said gas to produce neutrons; a pair of electrodes supported within said envelope, one of said electrodes substantially enclosing said material; means for applying an electric potential to said pair of electrodes to effect an ion-producing ionic discharge; an impedance connected in series circuit relation with said pair of electrodes and having an impedance of a value variable directly with the potential applied to said impedance; means for heating said material to said selected temperature to control the issuance of gas therefrom in response to an electrical condition at said impedance; and means for accelerating ions of said gas derived in said ionic discharge toward said target to a velocity sufficient to effect neutron-producing reactions.

14. A neutron generating system comprising: an envelope containing an ionizable gas and having an ion-source section for producing ions of said gas and an accelerating-gap section for accelerating ions of said gas toward a target adapted to react with said ions to produce neutrons; and a conduit fluidly communicating said ion-source section and said accelerating-gap section of said envelope.

15. A neutron generating system comprising: an envelope containing an ionizable gas and having an ion source section for producing ions of said gas and an accelerating-gap section for accelerating ions of said gas toward a target adapted to react with said ions to produce neutrons; a conduit fluidly communicating said ion-source section and said accelerating-gap section of said envelope; and a pump associated with said conduit for effecting a flow of said gas through said conduit in a direction from said accelerating-gap section toward said ion-source section of said envelope.

16. A neutron generating system comprising: an envelope containing an ionizable gas and having an ion-source section for producing ions of said gas and an accelerating-gap section for accelerating ions of said gas toward a target adapted to react with said ions to produce neutrons; a pump including a discharge chamber, a plurality of electrodes distributed along a path through said chamber, and means for producing an ionic discharge in said chamber and for energizing said electrodes to effect a flow of ions along said path; and means for fluidly communicating said pump with said ion-source section and said accelerating-gap section of said envelope.

17. A neutron generating system comprising: an envelope containing an ionizable gas and having an ion-source section for producing ions of said gas and an accelerating-gap section for accelerating ions of said gas toward a target adapted to react with said ions to produce neutrons; a pump including a long, cylindrical discharge chamber, a plurality of annular electrodes distributed in spaced, coaxial relationship along said chamber and thereby defining a common axis for said electrodes, another electrode extending along said axis, a solenoid enclosing said chamber and having successive turns distributed in coaxial relationship along said common axis, means for energizing said solenoid to produce a magnetic field having a component acting along said axis, and means for energizing said electrodes to produce an ionic discharge in said chamber and to effect a flow of ions along a path essentially coextensive with said axis; and means for fluidly communicating said pump with said ion-source section and said accelerating-gap section of said envelope so that gas flows from said pump into said ion-source section and from said accelerating-gap section to said pump.

18. A neutron generating system comprising: an envelope containing an ionizable gas and having an ion-source section for producing ions of said gas and an accelerating-gap section for accelerating ions of said gas toward a target adapted to react with said ions to produce neutrons; a conduit fluidly communicating said ion-source section and said accelerating-gap section of said envelope; and means for inhibiting the occurrence of an ionic discharge between said sections of said envelope via said conduit.

19. A neutron generating system comprising: an envelope containing an ionizable gas and having an ion-source section for producing ions of said gas and an accelerating-gap section for accelerating ions of said gas from an electrode toward a targe adapted to react with said ions to produce neutrons; a conduit fluidly communicating said ion-source section and said accelerating-gap section of said envelope; and an auxiliary electrode electrically connected to said first-mentioned electrode, interposed in a path between said target and said conduit and spaced from said target a distance sufficiently small to inhibit the occurrence of an ionic discharge between said sections of said envelope via said conduit.

20. A neutron generating system comprising: a sealed envelope containing an ionizable gas; a material adapted to emit said gas at a selected temperature; a target positioned within said envelope and adapted to react with ions of said gas to produce neutrons; a pair of electrodes supported within said envelope, one of said electrodes substantially coextensive with and enclosing said material, at least in part; means for applying an electric potential to said pair of electrodes to effect an ion-producing ionic discharge; means for selectively heating said material to said selected temperature to control the issuance of gas therefrom; and means for accelerating ions of said gas derived in said ionic discharge toward said target to a velocity sufficient to effect neutron-producing reactions.

21. A neutron generator system comprising: a sealed envelope containing an ionizable gas; a target positioned within said envelope and constructed of a compound including a first element having a heat-producing nuclear reaction with ions of said gas to produce neutrons and a second element remaining after neutron-producing reactions, said compound exhibiting a melting temperature substantially higher than that of said second element; means for deriving ions of said gas; and means for accelerating such ions toward said target with a velocity and intensity to effect neutron-producing reactions sufficient to raise the operating temperature of said target above the melting temperature of said second element but less than the melting temperature of said compound.

22. Apparatus according to claim 21 wherein said compound is a metallic tritide exhibiting a higher remelting temperature than the constituent metal of said tritide.

References Cited in the file of this patent

UNITED STATES PATENTS

| Number | Name | Date |
|---|---|---|
| 1,948,384 | Lawrence | Feb. 20, 1934 |
| 2,108,573 | Alfter | Feb. 15, 1938 |
| 2,161,985 | Szilard | June 13, 1939 |
| 2,202,588 | Kniepkamp | May 28, 1940 |
| 2,211,668 | Penning | Aug. 13, 1940 |
| 2,251,190 | Kallmann | July 29, 1941 |
| 2,285,622 | Slepian | June 9, 1942 |
| 2,453,118 | Buckingham et al. | Nov. 9, 1948 |
| 2,489,436 | Salisbury | Nov. 29, 1949 |
| 2,576,600 | Hanson | Nov. 27, 1951 |
| 2,581,446 | Robinson | Jan. 8, 1952 |
| 2,609,500 | Martin | Sept. 2, 1952 |
| 2,651,727 | Ehrenberg et al. | Sept. 8, 1953 |
| 2,708,247 | Bell | May 10, 1955 |
| 2,712,081 | Fearon et al. | June 28, 1955 |
| 2,735,943 | Wright et al. | Feb. 21, 1956 |
| 2,736,809 | Bacon | Feb. 28, 1956 |
| 2,767,324 | Van de Graaff | Oct. 16, 1956 |
| 2,769,096 | Frey | Oct. 30, 1956 |
| 2,774,882 | Wells | Dec. 18, 1956 |